US012584564B2

(12) United States Patent
Woo et al.

(10) Patent No.: US 12,584,564 B2
(45) Date of Patent: Mar. 24, 2026

(54) BALL VALVE AND BALL VALVE MODULE HAVING THE SAME

(71) Applicant: Hanon Systems, Daejeon (KR)

(72) Inventors: Sang Gu Woo, Daejeon (KR); Hae Jun Lee, Daejeon (KR); In Guk Hwang, Daejeon (KR); Zoltan Horvath, Daejeon (KR); Zsolt Literati, Daejeon (KR); Carsten Ohrem, Daejeon (KR); Daniel Zens, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/837,992

(22) PCT Filed: Apr. 19, 2023

(86) PCT No.: PCT/KR2023/005313
§ 371 (c)(1),
(2) Date: Aug. 13, 2024

(87) PCT Pub. No.: WO2023/219296
PCT Pub. Date: Nov. 16, 2023

(65) Prior Publication Data
US 2025/0155043 A1 May 15, 2025

(30) Foreign Application Priority Data

May 13, 2022 (KR) ......................... 10-2022-0058884

(51) Int. Cl.
*F16K 27/06* (2006.01)
*F16K 11/087* (2006.01)
(52) U.S. Cl.
CPC ........ *F16K 27/067* (2013.01); *F16K 11/0873* (2013.01)

(58) Field of Classification Search
CPC .. F16K 27/067; F16K 11/0876; F16K 5/0642; F16K 5/0689; F16K 2200/501; F16K 5/0678; F16K 27/003
See application file for complete search history.

(56) References Cited

U.S. PATENT DOCUMENTS 3,061,267 A * 10/1962 Hamer .................. F16K 5/0471
137/246.22
4,572,239 A * 2/1986 Koch .................... F16K 27/067
251/286
(Continued)

FOREIGN PATENT DOCUMENTS

KR 20050101781 A 10/2005
KR 20180039973 A 4/2018
(Continued)

OTHER PUBLICATIONS

International Search Report issued in PCT/KR2023/005313 on Jul. 20, 2023.

*Primary Examiner* — Michael R Reid
(74) *Attorney, Agent, or Firm* — NORTON ROSE FULBRIGHT US LLP

(57) ABSTRACT

A ball valve according to an exemplary embodiment of the present invention may comprise: an actuator; a housing having an interior space and a plurality of through-holes exposing the interior space, the through-holes including an inlet hole through while a refrigerant flows in, an outlet hole through which the refrigerant flows out, and a connection hole which is connected to the actuator; a ball having a flow path through which the refrigerant flows in connection with the inlet hole and the outlet hole, and being rotated by a rotary shaft of the actuator in the interior space; a sheet having a flow hole, through which the refrigerant passes in communication with the outlet hole, and arranged to be in contact with the ball between the housing and the ball so as (Continued)

to support the ball; and a sealing member placed between the seat and the housing.

13 Claims, 9 Drawing Sheets

(56) References Cited

U.S. PATENT DOCUMENTS

| 6,871,576 | B2 * | 3/2005 | Vari | ........................ F15B 19/00 |
| | | | | 137/865 |
| 10,400,901 | B2 * | 9/2019 | Salem | ................... F16K 5/0631 |
| 2019/0308489 | A1 * | 10/2019 | Spies | ..................... F25B 41/35 |
| 2020/0053874 | A1 | 2/2020 | Eom et al. | |

FOREIGN PATENT DOCUMENTS

| KR | 20210109872 | A | 9/2021 |
| KR | 102336972 | B1 | 12/2021 |

* cited by examiner

BALL VALVE AND BALL VALVE MODULE HAVING THE SAME

CROSS REFERENCE TO RELATED APPLICATIONS

This patent application is a national phase under 35 U.S.C. § 371 of International Patent Application No. PCT/KR2023/005313 filed Apr. 19, 2023, which claims the benefit of priority form Korean Patent Application No. 10-2022-0058884 filed May 13, 2022, each of which is hereby incorporated herein by reference in its entirety for all purposes.

TECHNICAL FIELD

The disclosure relates to a ball valve. Specifically, the disclosure relates to a cartridge-type ball valve detachably mounted to a manifold of a refrigerant system, and a ball valve module including the same.

BACKGROUND ART

The existing refrigerant ball valve includes a needle or ball for enlarging or reducing the area of a refrigerant channel, a structure for preventing internal leakage, and a housing for surrounding such a series of components. In addition, an actuator is provided on the top of the housing to actuate the needle or ball.

However, the existing refrigerant ball valve is required to connect separate refrigerant pipes to the inlet and outlet of the ball valve without leakage of a refrigerant flowing therein, thereby having problems of heat loss and pressure drop in an area of connection with the refrigerant pipes.

A recent trend toward refrigerant system modularization is developing manifolds in which pipes are integrated and serve as a body of modules. Accordingly, the need for a cartridge-type refrigerant ball valve that does not require separate pipe connection is on the rise, and relevant research has been conducted.

DISCLOSURE

Technical Problem

An embodiment of the disclosure is to provide a cartridge-type ball valve and a ball valve module including the same, in which a female flange structure, to which the existing refrigerant pipes are fastened, and an internal passage for connection with the female flange structure are not present in a housing, thereby simplifying an overall structure and reducing material costs and the number of components.

An embodiment of the disclosure is to provide a cartridge-type ball valve, which is simply inserted in and mounted to a manifold formed with a refrigerant passage, and a ball valve module including the same.

Problems to be solved by the embodiments are not limited to the forementioned problems, and other unmentioned problems will be clearly understood from the following description by those skilled in the art.

Technical Solution

According to an embodiment of the disclosure, a ball valve includes: an actuator; a housing including an inner space and a plurality of through holes to expose the inner space, the through holes including an inflow hole through which a refrigerant flows in, an outflow hole through which the refrigerant flows out, and a connection hole to which the actuator is connected; a ball including a channel through which the refrigerant flows in connection with the inflow hole and the outflow hole, and configured to rotate in the inner space by a rotary shaft of the actuator; a seat including a flow hole to communicate with the outflow hole and allow the refrigerant to pass therethrough, and placed between the housing and the ball to be in contact with the ball and support the ball; and a sealing member placed between the seat and the housing.

The sealing member may include a flange portion put on the seat and being in surface-contact with a surface of the seat, and a protruding portion protruding upward from the flange portion along a circumference of the flow hole, and the protruding portion may protrude outward further than an outer surface of the housing in the outflow hole.

The housing may include a mounting groove, to which the seat is mounted, around the outflow hole.

The outflow hole may include a first outflow hole, and a second outflow hole different in size from the first outflow hole, and the size of the second outflow hole is larger than the diameter of the ball.

The ball valve may further include a cap detachably mounted to the housing in the second outflow hole, wherein the cap mounted to the housing prevents the ball, and the seat and the sealing member arranged in a direction of the second outflow hole from separating outward from the inner space.

The cap may include an accommodating hole in a center thereof to expose the flow hole of the seat, and the refrigerant may flow passing through the accommodating hole and the flow hole.

The first outflow hole may be provided on a first lateral side of the housing, and the second outflow hole may be provided on a second lateral side connected to the first lateral side or a second lateral side facing the first lateral side.

The inflow hole may be provided on a bottom of the housing, and the connection hole may be provided on a top of the housing.

The ball may include an expansion groove connected to an opening through which the channel is exposed to the outside, and the expansion groove may be provided as a groove structure on a surface of the ball.

The expansion grooves may be provided forming at least one pair and arranged to face each other at an end of the opening.

According to an embodiment of the disclosure, a ball valve module includes: a ball valve; and a manifold including an installation hole on a top thereof, to which the ball valve is installed, a refrigerant inlet on a bottom thereof, into which the refrigerant is introduced, and a refrigerant passage on a lateral side thereof, through which the refrigerant flows, wherein the ball valve is inserted in the installation hole from above the manifold and fastened to the manifold.

The installation hole may be shaped corresponding to a horizontal cross-section of the housing of the ball valve, and a protruding portion of the sealing member protruding out of an outer surface of the housing may be compressed for sealing being in contact with a surface in the installation hole in a state that the housing is installed in the installation hole.

The channel of the ball rotatably provided within housing may be configured to communicate with the refrigerant passage in a state that the housing is installed in the installation hole.

Advantageous Effects

According to an embodiment of the disclosure, a female flange structure, to which the existing refrigerant pipes are fastened, and an internal passage for connection with the female flange structure are not present in a housing, thereby simplifying an overall structure and reducing material costs and the number of components.

Further, a cartridge-type ball valve is simply inserted in and mounted to a manifold formed with a refrigerant passage to improve the convenience of assembly, and applicable to the manifolds of various refrigerant system to have high compatibility.

MODE FOR INVENTION

Figure 1:
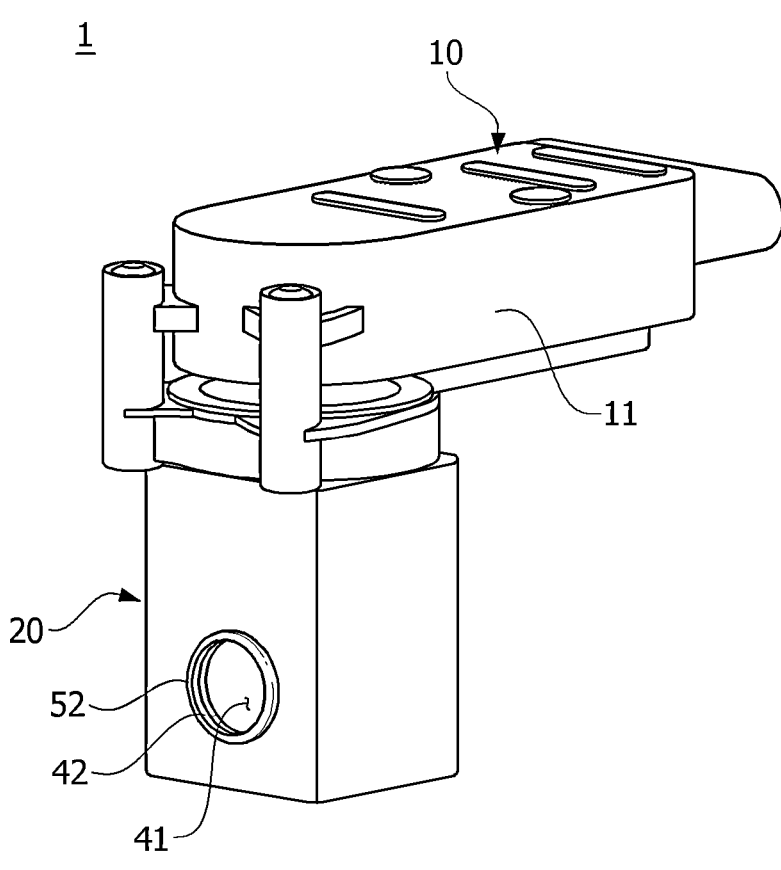
FIG. 1 is a perspective view schematically illustrating a ball valve according to an embodiment of the disclosure.

The disclosure may be modified in various ways and have various embodiments, and thus specific embodiments will be illustrated by way of example in the accompanying drawings and described in detail. It should be understood, however, the drawings and descriptions are not intended to limit the disclosure to the specific embodiments, but cover all modifications, equivalents, and alternatives that fall within the spirit and scope of the disclosure.

Although the terms "first," "second," etc. may be used herein to describe various elements, such elements should not be construed as limited by these terms. These terms are only used to distinguish one element from another. For example, a first element may be termed a second element, and the second element may also be termed the first element, without departing from the scope of the disclosure. The terms "and/or" may include combinations of a plurality of related described items or any of a plurality of related described items.

When an element is described as being "connected" or "coupled" to another element, it should be understood that the element may be directly connected or joined to another element but intervening elements may be present therebetween. However, when an element is described as being "directly connected" or "directly coupled" to another element, it should be understood that there are no intervening elements therebetween.

In description of embodiments of the disclosure, when it is mentioned that an element is formed "on" or "under" another element, it means that the mention includes a case where two elements are formed directly contacting with each other or are formed such that at least one separate element is interposed indirectly between the two elements. The "on" and "under" will be described to include the upward and downward directions based on one element.

The terms used herein are used to merely describe specific embodiments and not intended to limit the disclosure. The singular forms are intended to include the plural forms as well unless the context clearly indicates the singular forms. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless otherwise defined, all terms including technical and scientific terms used herein have the same meaning as commonly understood by a person of ordinary skill in the art to which the disclosure pertains. It will be further understood that terms defined in commonly used dictionaries should be interpreted as having a meaning consistent with their meaning in the context of the related art and will not be interpreted in an idealized or overly formal sense unless explicitly defined herein.

Hereinafter, exemplary embodiments will be described with reference to the accompanying drawings, in which like numerals refer to like or corresponding elements, and repetitive descriptions thereof will be omitted.

Figure 2:
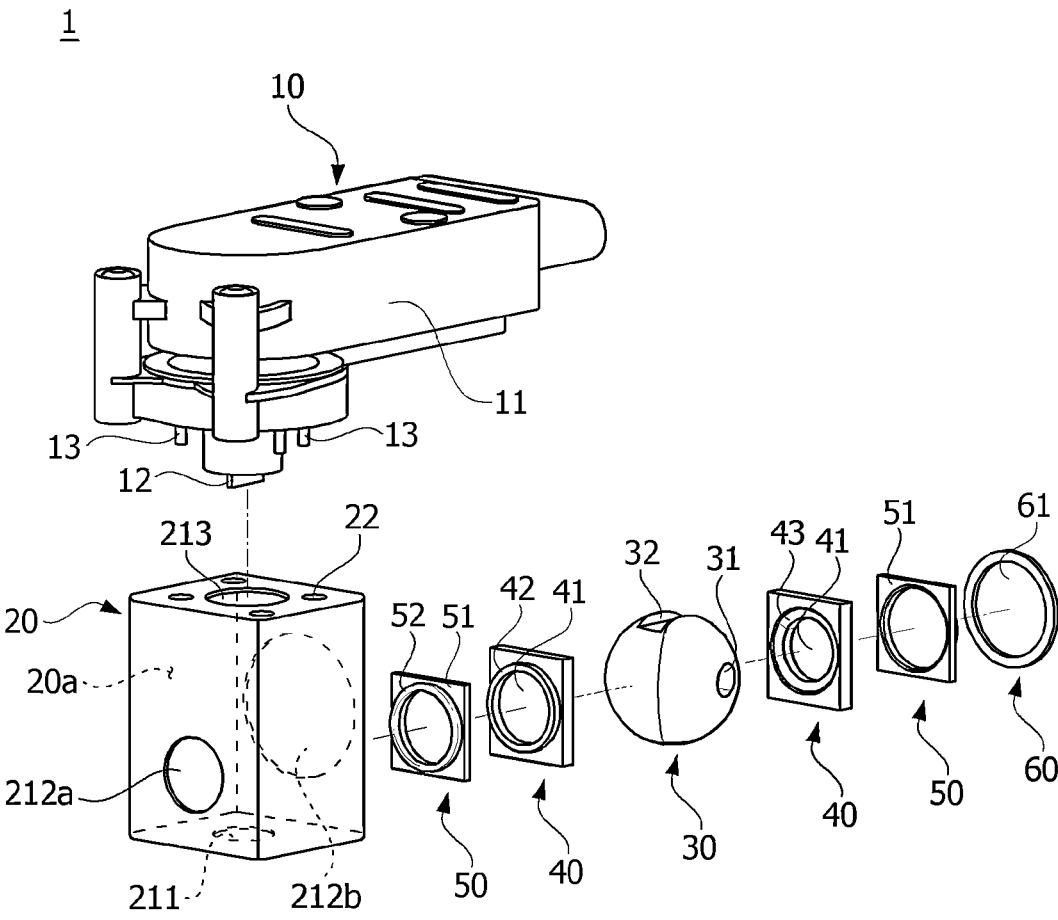
FIG. 2 is an exploded perspective view schematically illustrating a ball valve according to an embodiment of the disclosure.
Figure 3:
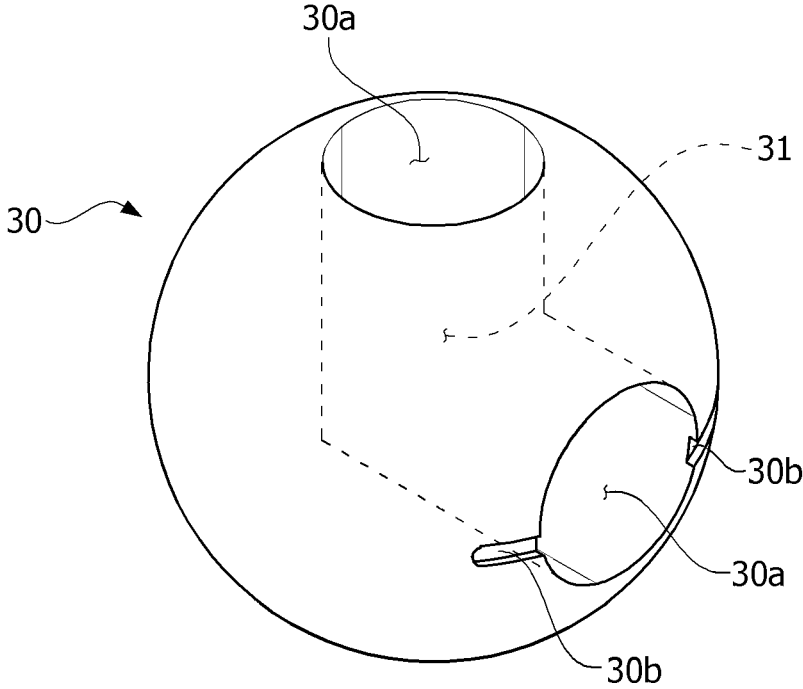
FIG. 3 is a view schematically illustrating a structure of a ball in a ball valve.
Figure 4:
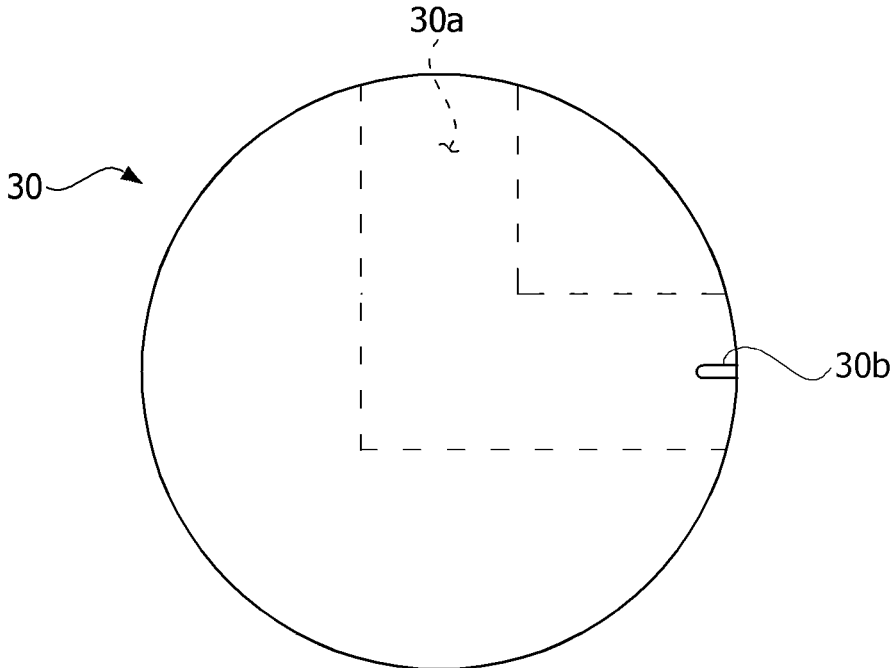
FIG. 4 is a view illustrating the ball of FIG. 3 viewed from laterally.
Figure 5:
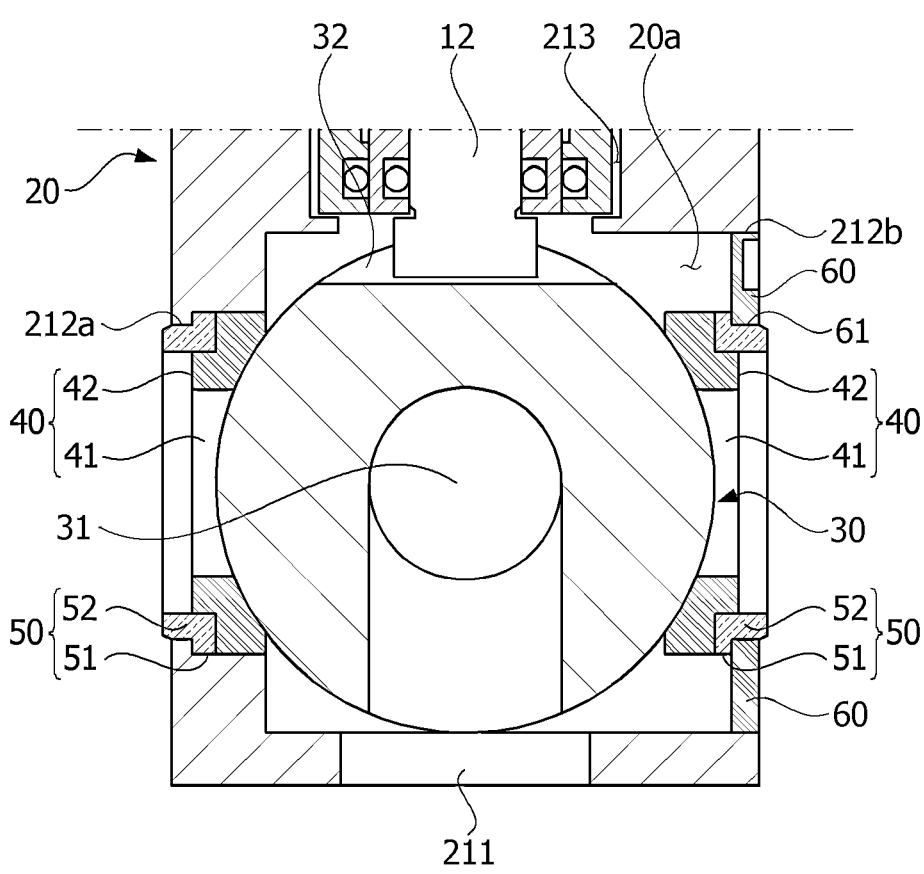
FIG. 5 is a cross-sectional view schematically illustrating a state that a ball, a seat, and a sealing member are assembled in a housing.
Figure 6:
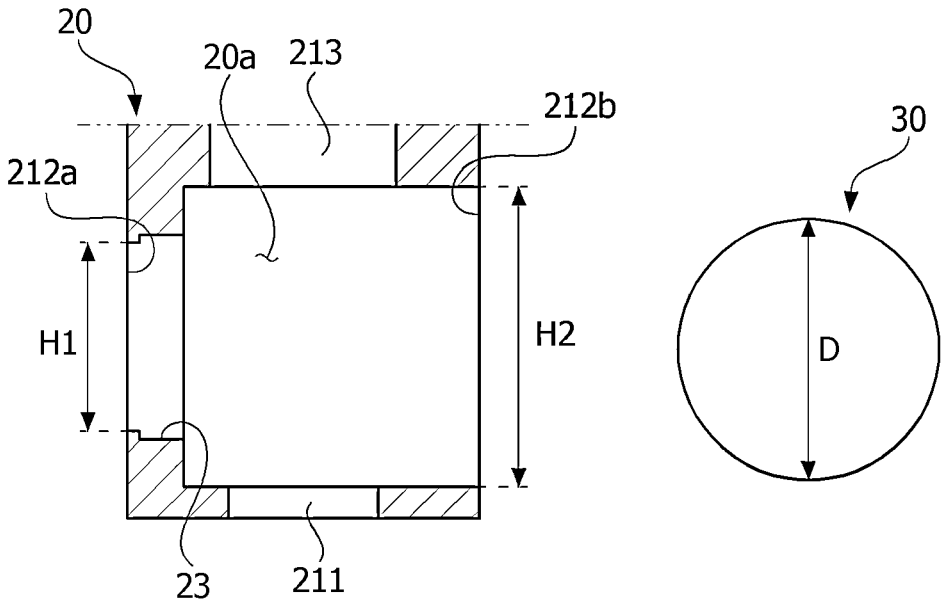
FIG. 6 is a schematic view showing the size of a through hole in a housing and the size of a ball.
Figure 7:
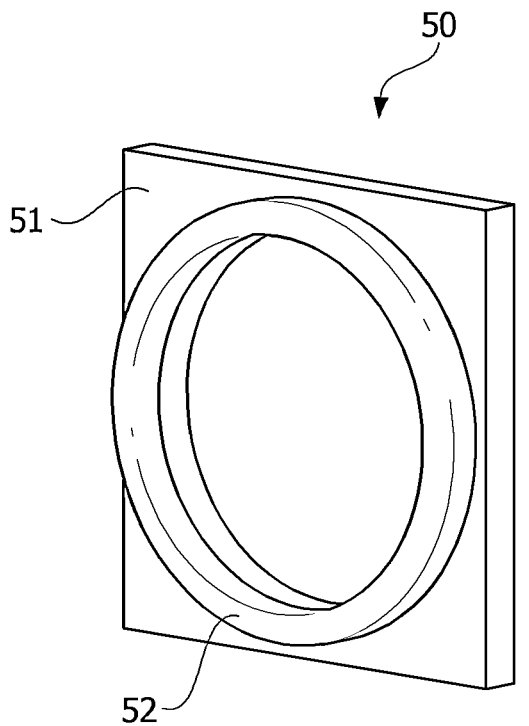
FIG. 7 is a perspective view schematically illustrating a sealing member.

FIG. 1 is a perspective view schematically illustrating a ball valve according to an embodiment of the disclosure, FIG. 2 is an exploded perspective view schematically illustrating a ball valve according to an embodiment of the disclosure, FIG. 3 is a view schematically illustrating a structure of a ball in a ball valve, and FIG. 4 is a view illustrating the ball of FIG. 3 viewed from laterally. FIG. 5 is a cross-sectional view schematically illustrating a state that a ball, a seat, and a sealing member are assembled in a housing, FIG. 6 is a schematic view showing the size of a through hole in a housing and the size of a ball, and FIG. 7 is a perspective view schematically illustrating a sealing member.

As shown therein, a ball valve 1 according to an embodiment of the disclosure may include an actuator 10, a housing 20, a ball 30, a seat 40, and a sealing member 50.

The actuator 10 may be electrically connected to an external power source to generate rotational force.

In general, the actuator 10 may include an electric actuator, a motor, and other various electric operating devices. According to an embodiment, the actuator 10 may include a casing 11, a rotary shaft 12 disposed inside the casing 11, a rotor (not shown), a stator (not shown), a bus bar (not shown), etc.

Securing pins 13 extending downward around the rotary shaft 12 may be provided on the bottom of the casing 11.

The housing 20 may have an inner space 20*a* to accommodate the ball 30 therein. According to an embodiment, the housing 20 may have a hexahedral structure roughly shaped like a box.

The housing 20 may be made of a rigid metal material. However, the material of the housing 20 is not limited to this rigid metal material.

The housing 20 may include a plurality of through holes 21 through which the inner space 20*a* is exposed. The through holes 21 may include an inflow hole 211 through which a refrigerant flows into the housing 20, an outflow hole 212 through which the refrigerant flows out of the housing 20, and a connection hole 213 to which the actuator 10 is connected.

According to an embodiment, the inflow hole 211 may be formed on the bottom of the housing 20, and the outflow hole 212 may be formed on the lateral side of the housing 20. In addition, the connection hole 213 may be formed on the top of the housing 20, and fitting holes 22 into which the securing pins 13 are inserted may be provided around the connection hole 213.

Accordingly, the actuator 10 may be mounted to the top of the housing 20 as the rotary shaft 12 is inserted in the connection hole 213 and the securing pins 13 are fitted into the fitting hole 22. The fitting holes 22 may guide the mounting position of the actuator 10, and, together with the securing pins 13, ensure that the actuator 10 is secured without moving on the housing 20.

The outflow hole 212 may include a first outflow hole 212*a*, and a second outflow hole 212*b* different in size from the first outflow hole 212*a*. In this case, the size (diameter H2) of the second outflow hole 212*b* may be larger than the size (diameter H1) of the first outflow hole 212*a*, and larger than the diameter D of the ball 30. Thus, the second outflow hole 212*b* may function as not only the outlet for the refrigerant but also the entrance for the ball 30. Through the second outflow hole 212*b*, the ball 30 may enter the housing 20, and may be replaced by another ball 30 as necessary.

According to an embodiment, the first outflow hole 212*a* may be provided on a first lateral side of the housing 20. The second outflow hole 212*b* may be provided on a second lateral side connected to the first lateral side or facing the first lateral side. This embodiment illustrates that the second outflow hole 212*b* is provided on the second lateral side facing the first lateral side on which the first outflow hole 212*a* is provided, so that the first outflow hole 212*a* and the second outflow hole 212*b* can be arranged in a structure of facing each other. Alternatively, the second outflow hole 212*b* may be provided on the second lateral side connected to the first lateral side so that the first outflow hole 212*a* and the second outflow hole 212*b* can be arranged in a structure of forming a right angle.

The housing 20 may include a mounting groove 23, to which the seat 40 is mounted, around the outflow hole 212. The mounting groove 23 may be recessed from an inner surface of the housing 20 toward an outer surface to have a predetermined size. This embodiment illustrates that the mounting groove 23 is provided in the first outflow hole 212*a*.

The ball 30 may have an overall spherical shape, and include a channel 31 through which the refrigerant flows in connection with the inflow hole 211 and the outflow hole 212 while the ball 30 is accommodated in the inner space 20*a* of the housing 20.

The ball 30 within the inner space 20*a* may be connected to the rotary shaft 12 of the actuator 10 and rotate together with the rotary shaft 12.

As the actuator 10 is mounted to the top of the housing 20 through the connection hole 213, the rotary shaft 12 may be placed extending into the inner space 20*a*. In addition, the ball 30 may be fastened to the end of the rotary shaft 12.

According to an embodiment, the ball 30 may include a connection groove 32 to which the end of the rotary shaft 12 is fastened. The connection groove 32 may be recessed from the surface of the ball 30 to a predetermine depth. The end of the rotary shaft 12 may be fitted and fastened to the connection groove 32.

In this way, the ball 30 is detachably coupled to the rotary shaft 12, and thus easily replaced by a ball suitable for the purposes and structures corresponding to manifolds M of refrigerant systems having various structures.

FIGS. 3 and 4 show an alternative example of the ball 30.

As shown in FIGS. 3 and 4, the ball 30 may include expansion grooves 30*b* connected to an opening 30*a* through which the channel 31 is exposed to the outside.

The expansion grooves 30*b* may be provided having an elongated groove structure on the surface of the ball 30, and expand the refrigerant based on pressure change of a flowing refrigerant. According to an embodiment, the expansion grooves 30*b* may be provided forming at least one pair and arranged to face each other at the end of the opening 30*a*.

In this way, the ball 30 with the expansion grooves 30*a* may operate to move or expand the refrigerant. In other words, the ball 30 may rotate to change the positions of the opening 30*a* and the expansion grooves 30*b* of the channel 31 and operate to move or expand the refrigerant.

According to this embodiment, the expansion grooves 30*b* having the groove structure is provided to expand the refrigerant, but is not limited thereto. Alternatively, an expansion hole (not shown) having a hole structure to penetrate the ball 30 may be provided.

The seat 40 may be placed to be in contact with the ball 30 between the housing 20 and the ball 30 and support the ball 30.

The seat 40 may be formed with a flow hole 41 at the center thereof to communicate with the outflow hole 212 and allow the refrigerant to pass therethrough. The surface of the seat 40 may have a stepped structure 42 that protrudes in a circular form around the flow hole 41.

The seat 40 may include a contact surface 43 with which the ball 30 is in contact. The contact surface 43 may be curved or inclined corresponding to the curved surface of the ball 30 so that the ball 30 can rotate smoothly.

According to an embodiment, the seat 40 may be made of a Teflon material. However, the material of the seat 40 is not limited to the Teflon material.

The sealing member 50 may be placed between the seat 40 and the housing 20.

According to an embodiment, the sealing member 50 may be made of an elastic material, for example, a rubber material. However, the material of the sealing member 50 is not limited to the elastic material.

The sealing member 50 may include a flange portion 51 put on the seat 40 and being in surface-contact with the surface of the seat 40, and a protruding portion 52 protruding upward from the flange portion 51 along the circumference of the flow hole 41.

The flange portion 51 may be shaped corresponding to the shape of the seat 40. The protruding portion 52 may allow the protruding stepped structure 42 of the seat 40 to be inserted and fitted into the inner circumferential surface thereof.

The sealing member 50 may be provided to have a structure that the protruding portion 52 protrudes out of the outer surface of the housing 20 in the outflow hole 212 while being placed between the seat 40 and the housing 20.

Accordingly, the sealing member 50 may not only prevent the refrigerant from leaking inside the housing 20, but also prevent the refrigerant from leaking between the ball valve 1 inserted in a manifold M (to be described later) and the manifold M. This is equivalent to the integration of two O-rings respectively mounted to the inner and outer surfaces of the housing in the existing ball valve, thereby having effects on reducing the number of components and reducing manufacturing costs. Further, the structure is simplified, thereby having effects on simplifying an assembly process and improving productivity.

According to an embodiment, the ball valve 1 may further include a cap 60 detachably mounted to the housing 20 in the second outflow hole 212.

When mounted to the housing 20, the cap 60 may prevent the ball 30, and the seat 40 and the sealing member 50 arranged in the direction of the second outflow hole 212*b* from separating outward from the inner space 20*a*. In other words, the cap 60 reduces the size of the second outflow hole 212*b* so that the ball 30 accommodated in the inner space 20*a*, the seat 40 and the sealing member 50 can remain secured without separation.

The cap 60 may be formed with an accommodating hole 61 in the center thereof to expose the flow hole 41 of the seat 40. The flow hole 41 may be exposed to the outside through the accommodating hole 61, and the refrigerant may flow passing through the accommodating hole 61 and the flow hole 41.

Figure 8A:
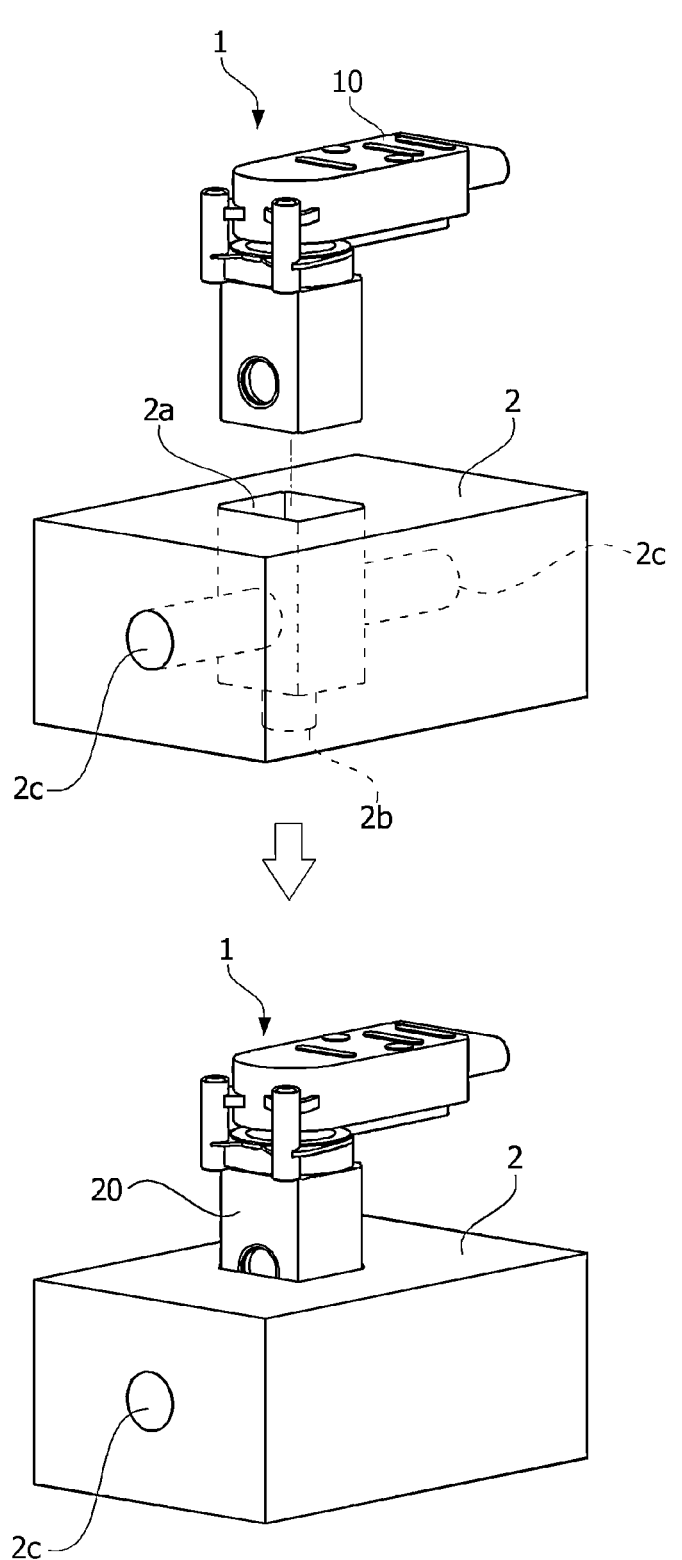
FIGS. 8A and 8B are schematic views showing a process of coupling a ball valve according to an embodiment of the disclosure to a manifold.
Figure 8B:
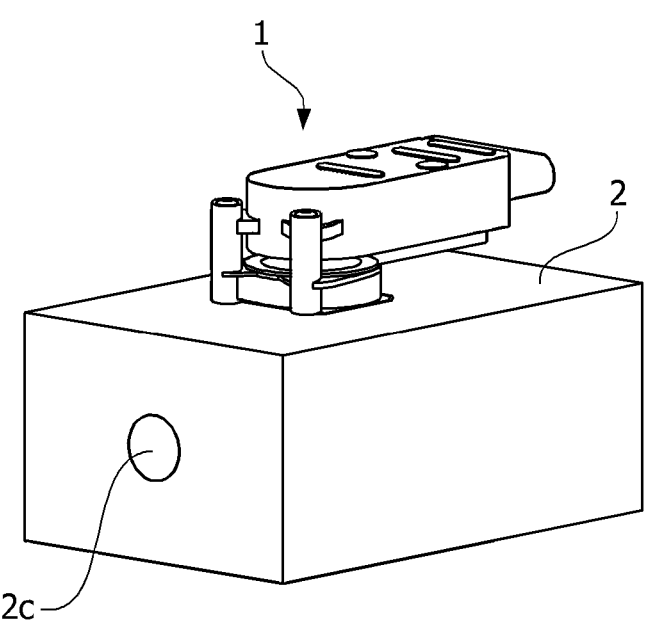
Figure 9:
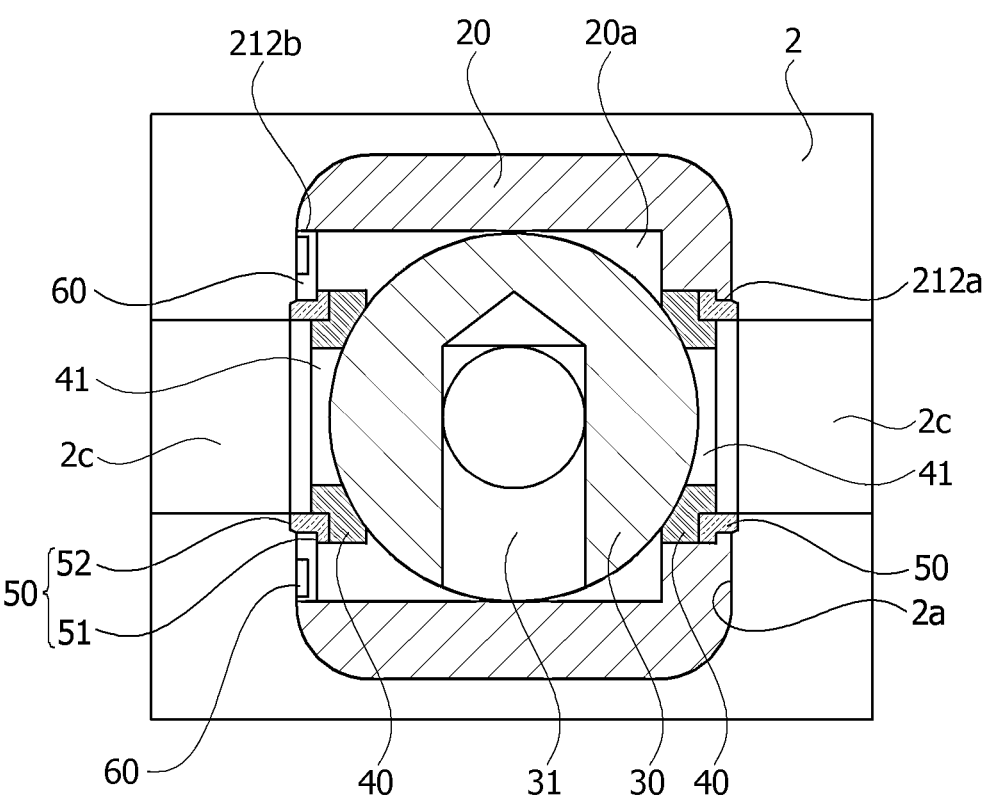
FIGS. 9 and 10 are horizontal and vertical cross-sectional views schematically illustrating a state that a ball valve is coupled to a manifold.
Figure 10:
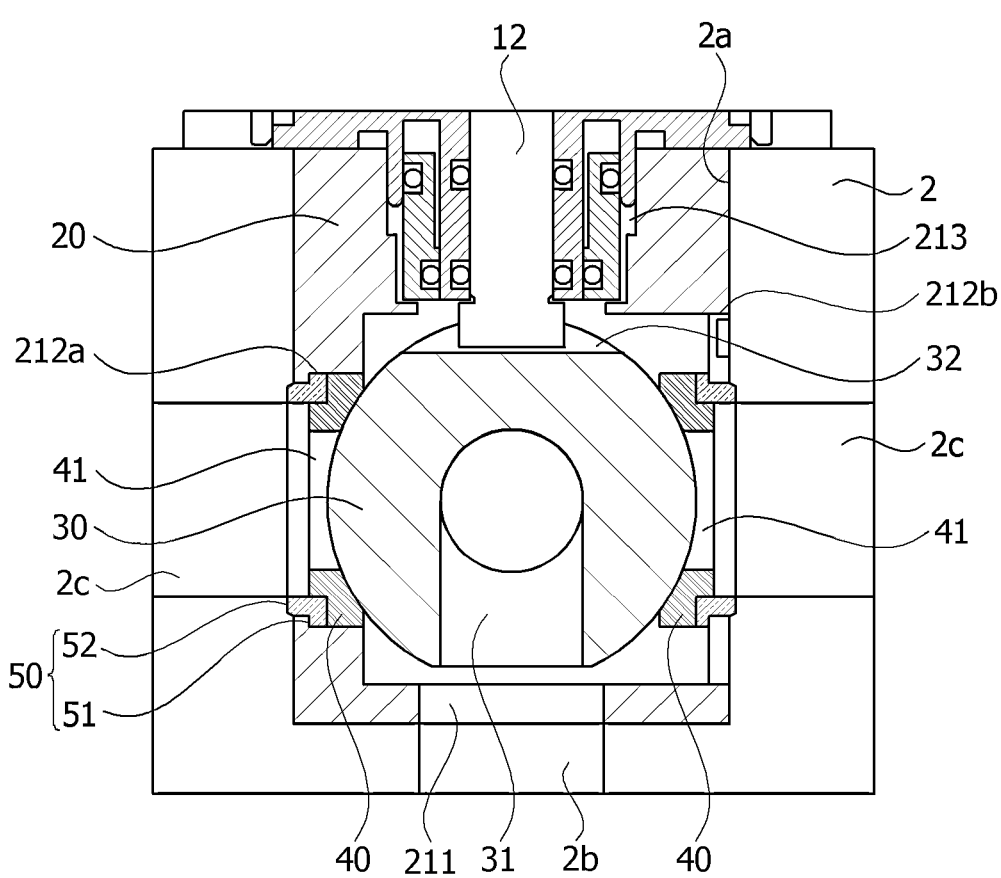

FIGS. 8A and 8B schematically show a process of completing a ball valve module by coupling the ball valve 1 to a manifold 2, and FIGS. 9 and 10 are horizontal and vertical cross-sectional views viewed from above, which show a state that the ball valve 1 is coupled to the manifold 2.

The ball valve module may include the foregoing ball valve 1, and the manifold 2 serving as a body.

The manifold 2 may include an installation hole 2*a* on the top thereof, to which the ball valve 1 is installed. The installation hole 2*a* may be recessed to a predetermined depth from the top of the manifold 2, and shaped corresponding to the horizontal cross-section of the housing 20 of the ball valve 1.

The manifold 2 includes a refrigerant inlet 2*b* on the bottom thereof, into which the refrigerant is introduced, and the refrigerant inlet 2*b* may be connected to the installation hole 2*a* while penetrating the bottom of the manifold 2. In addition, the manifold 2 may include refrigerant passages 2*c* on both sides thereof, through which the refrigerant flows, and the refrigerant passages 2*c* may be connected to the installation hole 2*a* while penetrating the lateral sides of the manifold 2.

The ball valve 1 is inserted in the installation hole 2*a* provided on the top of the manifold 2 with the housing 20 facing downward, and the housing 20 is fitted and secured to the installation hole 2*a* by pressing the actuator 10 downward, thereby completing the assembly of the ball valve module.

In addition, a bolt or the like fastening means may be used to fasten the actuator 10 to the manifold 2, thereby preventing the ball valve 1 from moving due to vibration or the like when the actuator operates.

In this way, the ball valve 1 is simply inserted in the manifold 2 and thus fastened to the manifold 2, and the channel 31 of the ball 30, together with the outflow hole 212 of the housing 20, is connected to the refrigerant inlet 2*b* and the refrigerant passages 2*c* in the manifold 2 without connection of separate pipes In particular, the protruding portion 52 of the sealing member 50 protruding further than the outer surface of the housing 20 is compressed being in contact with the surface in the installation hole 2*a* within the housing 20 in the state that the housing 20 is inserted and installed in the installation hole 2*a* of the manifold 2, and maintains the compressed state while surrounding a refrigerant passage P, thereby preventing the refrigerant from leaking between the ball valve 1 and the manifold 2.

In this way, according to the disclosure, two O-rings for preventing the refrigerant from leaking inside and outside the existing ball valve are unified into a single sealing member, and there is no need to additionally install a separate O-ring between the ball valve 1 and the manifold 2 when the ball valve 1 is mounted to the manifold 2 of the ball valve module, thereby simplifying and facilitating the installation and the assembly. In other words, advantageously, the sealing member 50 provided inside the ball valve 1 and used for sealing between the housing 20 and the ball 30 may also be used for sealing between the ball valve 1 and the manifold 2.

Although a few embodiments of the disclosure have been described, it will be understood that various modifications and changes can be made by a person having ordinary knowledge in the art without departing from the spirit and scope of the disclosure set forth in the appended claims. In addition, differences related to these modifications and changes should be construed as falling within the scope of the disclosure defined in the appended claims.

The invention claimed is:

1. A ball valve comprising:
   an actuator;
   a housing comprising an inner space and a plurality of through holes to expose the inner space, the through holes comprising an inflow hole through which a refrigerant is configured to flow in, an outflow hole through which the refrigerant is configured to flow out, and a connection hole to which the actuator is connected, wherein the outflow hole comprises a first outflow hole and a second outflow hole different in size from the first outflow hole;
   a ball comprising a channel through which the refrigerant is configured to flow in connection with the inflow hole and the outflow hole, and configured to rotate in the inner space by a rotary shaft of the actuator;
   a seat comprising a flow hole to communicate with the outflow hole and allow the refrigerant to pass therethrough, and placed between the housing and the ball to be in contact with the ball and support the ball;
   a cap detachably mounted to the housing in the second outflow hole; and
   a pair of sealing members, wherein one of the pair of sealing members is placed between the seat and the housing in the first outflow hole, and the other of the pair of sealing members is placed between the seat and the cap in the second outflow hole,
   wherein the cap comprises an accommodating hole in a center thereof to expose the flow hole of the seat, and
   wherein the sealing member placed between the seat and the cap in the second outflow hole is configured to protrude outward further than an outer surface of the cap through the accommodating hole.

2. The ball valve of claim 1, wherein the sealing member comprises a flange portion put on the seat and being in surface-contact with a surface of the seat, and a protruding portion protruding upward from the flange portion along a circumference of the flow hole, and the protruding portion protrudes outward further than an outer surface of the housing in the outflow hole.

3. The ball valve of claim 1, wherein the housing comprises a mounting groove, to which the seat is mounted, around the outflow hole.

4. The ball valve of claim 1, wherein the size of the second outflow hole is larger than the diameter of the ball.

5. The ball valve of claim 4, wherein the cap mounted to the housing prevents the ball, and the seat and the sealing member arranged in a direction of the second outflow hole from separating outward from the inner space.

6. The ball valve of claim 5, wherein the cap comprises an accommodating hole in a center thereof to expose the flow hole of the seat, and the refrigerant is configured to flow through the accommodating hole and the flow hole.

7. The ball valve of claim 4, wherein the first outflow hole is provided on a first lateral side of the housing, and the second outflow hole is provided on a second lateral side connected to the first lateral side or a second lateral side facing the first lateral side.

8. The ball valve of claim 7, wherein the inflow hole is provided on a bottom of the housing, and the connection hole is provided on a top of the housing.

9. The ball valve of claim 1, wherein the ball comprises an expansion groove connected to an opening through which the channel is exposed to the outside, and the expansion groove is provided as a groove structure on a surface of the ball.

10. The ball valve of claim 9, wherein the expansion groove is provided forming at least one pair and arranged to face each other at an end of the opening.

11. A ball valve module comprising:

a ball valve; and a manifold comprising an installation hole on a top thereof, to which the ball valve is installed, a refrigerant inlet on a bottom thereof, into which the refrigerant is configured to be introduced, and a refrigerant passage on a lateral side thereof, through which the refrigerant is configured to flow, wherein the ball valve comprises:

an actuator;

a housing comprising an inner space and a plurality of through holes to expose the inner space, the through holes comprising an inflow hole through which a refrigerant is configured to flow in, an outflow hole through which the refrigerant is configured to flow out, and a connection hole to which the actuator is connected;

a ball comprising a channel through which the refrigerant is configured to flow in connection with the inflow hole and the outflow hole, and configured to rotate in the inner space by a rotary shaft of the actuator;

a seat comprising a flow hole to communicate with the outflow hole and allow the refrigerant to pass therethrough, and placed between the housing and the ball to be in contact with the ball and support the ball; and a sealing member placed between the seat and the housing, wherein the ball valve is inserted in the installation hole from above the manifold and fastened to the manifold.

12. The ball valve module of claim 11, wherein the installation hole is shaped corresponding to a horizontal cross-section of the housing of the ball valve, and a protruding portion of the sealing member protruding out of an outer surface of the housing is compressed for sealing being in contact with a surface in the installation hole in a state that the housing is installed in the installation hole.

13. The ball valve module of claim 12, wherein the channel of the ball rotatably provided within the housing is configured to communicate with the refrigerant passage in a state that the housing is installed in the installation hole.

* * * * *